(12) United States Patent
Wood (10) Patent No.: US 7,854,556 B2
(45) Date of Patent: Dec. 21, 2010

(54) CAMERA MOUNTING SYSTEM

(76) Inventor: Dennis Wood, 106 North Cumberland, Unit 208, Thunder Bay, ON (CA) P7A 4M2

( * ) Notice: Subject to any disclaimer, the term of this patent is extended or adjusted under 35 U.S.C. 154(b) by 63 days.

(21) Appl. No.: 12/246,548

(22) Filed: Oct. 7, 2008

(65) Prior Publication Data

US 2010/0086295 A1    Apr. 8, 2010

(51) Int. Cl.
*G03B 17/00* (2006.01)
(52) U.S. Cl. ...................... 396/428; 396/419
(58) Field of Classification Search ............. 396/5, 396/419, 422, 428
See application file for complete search history.

(56) References Cited

U.S. PATENT DOCUMENTS

| | | | | |
|---|---|---|---|---|
| 2,811,076 A | * | 10/1957 | Pollick | ................. 352/85 |
| 3,589,260 A | | 6/1971 | Ferra | |
| 3,598,355 A | * | 8/1971 | English | ............... 396/428 |
| 5,225,863 A | * | 7/1993 | Weir-Jones | ............ 396/56 |
| 5,908,181 A | * | 6/1999 | Valles-Navarro | ...... 248/177.1 |
| 2005/0231689 A1 | * | 10/2005 | Longley | ................ 352/243 |

OTHER PUBLICATIONS www.zacuto.com.

* cited by examiner

*Primary Examiner*—W. B. Perkey
*Assistant Examiner*—Warren K Fenwick
(74) *Attorney, Agent, or Firm*—Ade & Company Inc.; Ryan W. Dupuis; Kyle R. Satterthwaite (57) ABSTRACT

A camera mounting system comprises a pair of rail members, a camera mount arranged to support a video camera on the pair of rail members and a base mount arranged to support the pair of rails on a tripod. The camera mount and the base mount are supported for adjustment relative to one another along the rail members. The camera mount supports the video camera thereon and is supported on the rail members by a pair of link members, each pivotally coupled at a lower end on the rail members and at an upper end on the camera mount. The linkage permits the camera mount and camera thereon to be adjusted in elevation relative to the rail members by pivoting the linkage while being arranged so as not to project below the rail members in both lowered and elevated positions such that the linkage does not interfere with relative movement between the base mount and the camera mount.

20 Claims, 6 Drawing Sheets

CAMERA MOUNTING SYSTEM

FIELD OF THE INVENTION

The present invention relates to a camera mounting system for mounting a video camera and various camera accessories for adjustment relative to one another along a pair of rail members, and more particularly relates to a camera mounting system including rail members supporting a video camera thereon and which are arranged to be supported on a base structure, for example a tripod.

BACKGROUND

When supporting a camera on a base structure, for example a video camera on a tripod, it is common to provide a mounting system for supporting various camera accessories, for example lenses and the like, relative to the camera body.

U.S. Pat. No. 3,589,260 by Ferra discloses an example of an adjustable camera mount for mounting a motion picture camera and a lens assembly on a tripod. The camera mount however is complex in configuration and limited to a specific type of motion picture camera.

More recently it is known to support a video camera and camera accessories on a pair of rail members in which a base mount for connection to a tripod, a camera mount for connection to a camera and various accessory mounts for supporting camera accessories thereon are all supported adjustably relative to one another on the rail members. Examples of camera mounting systems using a pair of rail members are available by Zacuto and can be found at www.zacuto.com.

Known camera mounting systems using a pair of rail members typically do not provide a camera mount which is adjustable in height relative to other accessories supported on the rails or the camera mount involves height adjustment by a vertical sliding member which projects downwardly below the rail members and which interferes with mounting of the rail members on a base structure such as a tripod. Furthermore known camera mounting systems incorporating rail members are typically limited in use to either a specific tripod mounting configuration or a specific shoulder mounting configuration.

SUMMARY OF THE INVENTION

According to one aspect of the invention there is provided a camera mounting system for supporting a camera body of a video camera on a base structure, the system comprising:

a pair of rail members extending in a longitudinal direction;

a base mount arranged to support the rail members parallel and spaced apart from one another on the base structure in a generally horizontal orientation;

a camera mount arranged to support the camera body of the video camera thereon; and a linkage pivotally coupled between the camera mount and the rail members such that the camera mount is movable relative to the rail members between an elevated position in which the camera mount is supported spaced above the rail members and a lowered position in which the camera mount is supported closer to the rail members than the elevated position;

the base mount and the camera mount being movable relative to one another in the longitudinal direction of the rail members.

The camera mounting system according to the present invention provides a pivotal linkage supporting the camera mount onto the rail members such that the height of the camera mount can be readily adjusted to an infinite number of heights relative to the rail members by simple pivoting and folding of the linkage while ensuring that the linkage remains at or above the height of the rail members. In this manner the camera mount does not interfere with placement of the base mount for securing the rail members to a tripod in a manner which always permits balancing of the camera and camera accessories relative to the tripod.

The pivotal nature of the linkage supporting the camera mount on the rail members also permits variation of the camera mount into various other configurations corresponding to either a tripod mounting configuration or a shoulder mounting configuration of the camera for example. Use of a pivoting linkage further permits a simple lightweight design which is easily manufactured at low cost and readily permits various components to be interchanged with one another for maintenance or for variance of the configuration of the camera mounting system. The simplicity provides a lightweight design which can be further reduced in weight while more stably supporting camera equipment thereon when using rail members comprising solid carbon fibre.

Preferably the linkage is arranged to be positioned so as not to project substantially below the rail members in both the lowered position and the elevated position such that the linkage does not interfere with relative movement between the base mount and the camera mount in either one of the lowered position or the elevated position of the camera mount.

The base mount preferably comprises a rail mount mounted on the rail members so as to be arranged for sliding movement along the rail members and a base plate arranged to be mounted onto the base structure, in which the rail mount is connected to the base plate such that the base plate is oriented substantially parallel to the rail members.

Preferably the rail mount is offset adjacent one end of the base plate such that the base plate is arranged to extend beneath the camera mount when the rail mount is located on the rail members adjacent the linkage.

The linkage may comprise at least one link member, and more preferably comprises two link members which are pivotally mounted between the rail members at a lower end and pivotally mounted on the camera mount at respective opposing ends of the camera mount at an upper end of the link member.

Preferably the link members are arranged to be received between the rail members parallel to the rail members in the lowered position of the camera mount.

Each link member may be supported on the rail members by a pivot shaft extending perpendicular to the rail members between a pair of rail mounts which are mounted on the rail members respectively so as to be arranged for sliding movement along the rail members. Each link member may be arranged for sliding movement between the rail members along the pivot shaft to provide some adjustment in a lateral direction relative to one another.

The upper end of each link member may be pivotal about a pivot shaft arranged to be fixed to the camera mount while the lower end of the link member is pivotal about a pivot shaft arranged to be fixed between the rail members. Preferably both of the pivot shafts of each link member are oriented generally horizontally and perpendicularly to the longitudinal direction of the rail members.

There may be provided a pivot locking mechanism arranged to selectively prevent relative rotation of each link member about the respective pivot shafts.

There may also be provided an auxiliary link associated with each link member in which the auxiliary link and the link member are different in length relative to one another, but otherwise identical in configuration so as to be interchangeable with one another.

The camera mount may have a lower portion which is coupled to the linkage and which is arranged to be received between the rail members in the lowered position and an upper portion projecting laterally outwardly beyond opposing sides of the lower portion so as to be arranged to be engaged upon the rail members in the lowered position. The upper portion may further comprise a slot extending in the longitudinal direction of the rail members so as to be arranged to receive a camera mounting fastener at any one of a plurality of positions along the slot.

When the linkage comprises two link members pivotally coupled to opposing ends of the camera mount at respective upper ends of the link members and being arranged to be pivotally coupled to the rail members at respective lower ends of the link members in a base structure mounting mode, preferably at least one of the link members is releasable from the rail members such that the link members, together with the camera mount extending therebetween, are arranged to form an inverted U-shaped configuration extending beyond an end of the rail members so as to be arranged to receive a shoulder of a camera operator therein in a shoulder mounting mode. There may also be provided a pair of auxiliary rails arranged to be coupled to the lower end of the link member which is released from the rail members in the shoulder mounting mode and at least one camera accessory supported on the auxiliary rails.

Each rail member preferably comprises an elongate rod formed of carbon fibre.

When the linkage is arranged to support the camera mount on the rail members such that a camera supported on the camera mount is directed forwardly in the longitudinal direction of the rail members, the system may further comprise an accessory mount arranged to support a video camera accessory, for example a lens accessory, on the rail members forwardly of the camera mount.

The base mount is preferably arranged to be supported on a base structure comprising a tripod.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a camera mounting system generally indicated by reference numeral 10. The system 10 is particularly suited for supporting a video camera 12 having a camera body 14 typically supported by an adapter 15 on a tripod 16 or other suitable base structure.

The camera mounting system 10 is usable in a base mounting mode in which the video camera 12 along with various camera accessories including auxiliary lenses 18, lens adapters 20, matte boxes 22 and the like are supported in a balanced configuration on a base structure as a tripod. The camera mounting system 10 as described herein can also be supported in a shoulder mounting mode in which additional accessories such as a video monitor 24, a battery pack 26 and handle grips 28 can be supported relative to the camera in a suitable ergonomic configuration.

The system 10 generally comprises two rail members 30 which are elongate in a longitudinal direction thereof. Each rail member is an elongate rod of circular cross section formed of solid carbon fibre material.

A base mount 32 is provided for mounting the two rail members parallel and spaced apart from one another on a tripod 16 or other suitable structure so that the rail members are generally horizontal in orientation. The base mount generally comprises a rail mount 34 for mounting onto the rail members 30 and a base plate 36 arranged for quick coupling attachment to a head of the tripod 16.

Figure 7:
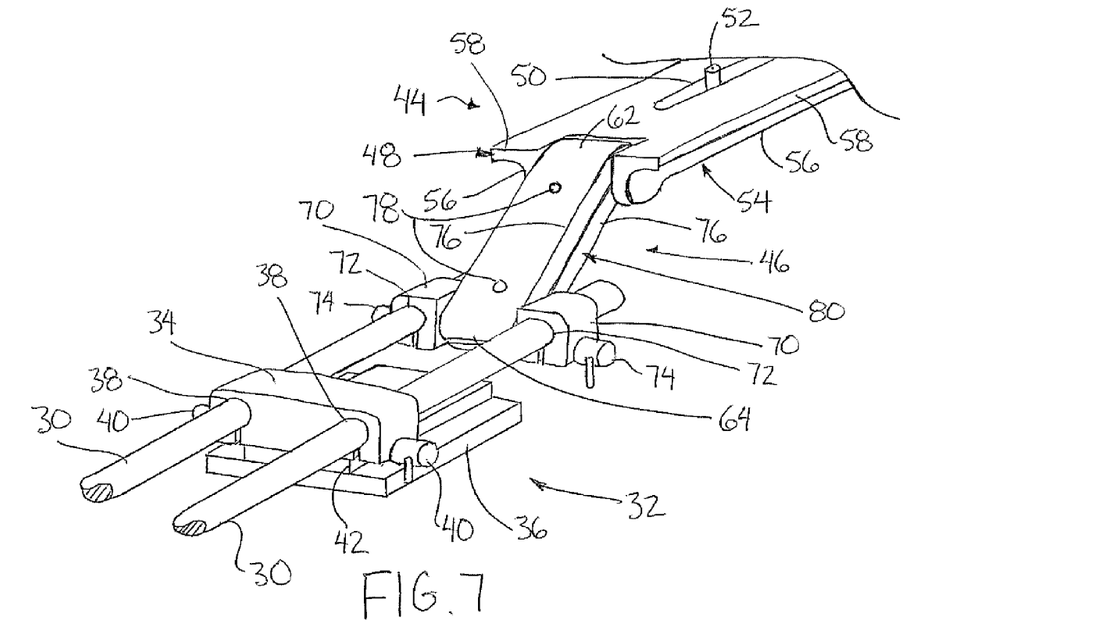
FIG. 7 is a perspective view of the base mount on the rail members relative to one of the link members of the linkage supporting the camera mount on the rail members.
Figure 8:
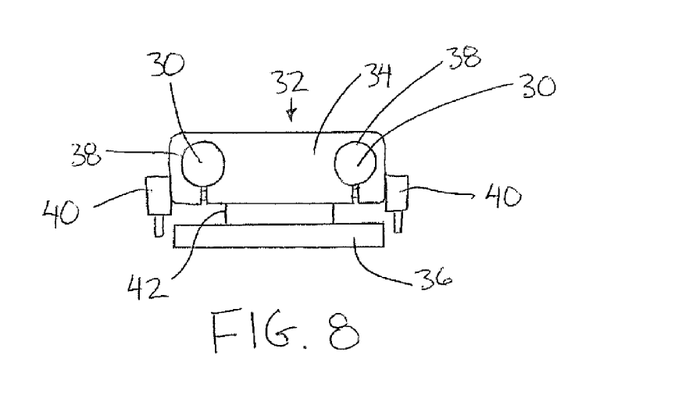
FIG. 8 is an end elevational view of the base mount.

The rail mount 34 of the base mount comprises a body including a pair of parallel and spaced apart bores 38 extending horizontally therethrough which are suitably sized for receiving respective ones of the two rail members 30 slidably therethrough. An expansion gap extends radially downward through the body from each bore 38 to the bottom side of the body of the rail mount to allow some slight variation of the diameter of the bores 38 about the rail members. A suitable clamping fastener 40 spans across each gap so that tightening the fastener 40 serves to close the gap and tighten the bore 38 about the respective rail member.

Accordingly each bore 38 functions as a clamp operable between a released position slidable along the rail member and a clamped position tightened about the rail member so as to fix the longitudinal position of the base mount relative to the rail members. The heads of the clamp fasteners 40 are located at opposing external sides of the body of the rail mount for accessibility by the operator of the camera mounting system. In the illustrated embodiment the heads of the clamp fasteners include levers extending radially outward therefrom for manual tightening and releasing of the fasteners without additional tools being required, however a suitable socket may also be formed in the heads of the fasteners for additional securement using tools if desired.

The base plate 36 of the base mount is mounted below the rail mount 34 to extend generally horizontally, below and parallel to the rail members. A central spacer 42 is coupled between the body of the rail mount at a location spaced between the bores 38 to support the base plate 36 therebelow spaced below the rail members. The base plate 36 is joined to the rail mount at a location offset to one end of the base plate.

The camera is supported on a camera mount 44 which is in turn supported on the rail members by a suitable linkage 46. The linkage 46 and camera mount 44 are arranged to support the camera thereon such that the camera is directed in a forward direction of video capture which corresponds to the longitudinal direction of the rail members. Pivoting of the linkage permits the camera mount to be displaced relative to the rail members between an elevated position in which the camera mount is supported spaced above the rail members and a lowered position in which the camera mount is supported closer to the rail members or directly adjacent to the rail members.

The camera mount 44 comprises an upper portion 48 generally in the form of a flat plate having an upper surface suitable for receiving the base mounting adapter 15 at the base of the camera body 14 thereon. The upper portion is provided with an elongate slot 50 centrally located in the upper surface which extends in the longitudinal direction of the rail members. The slot 50 is suitably arranged for receiving camera mounting fasteners 52 therethrough which serve to secure the mounting adapter 50 of the camera 12 to the upper surface of the camera mount 44. The mounting fasteners 52 can be slidably displaced in the longitudinal direction along the slot 50 to permit some adjustment of the camera being mounted onto the camera mount 44.

The camera mount 44 further comprises a lower portion 54 comprising two parallel and spaced apart flanges 56 which depend downwardly from the flat plate forming the upper portion 48 while being oriented to extend in the longitudinal direction of the rail members. The flanges 56 are spaced apart on opposing sides of the central slot 50 and extend between opposing ends of the elongate upper portion 48. The spacing between the flanges 56 is suitable to permit the flanges to be received extending downwardly between the two parallel and spaced apart rail members 30.

The upper portion 48 is arranged to be wider than the lower portion 54 in a lateral direction oriented perpendicularly to the longitudinal direction of the rails so that opposing side edges of the upper portion 48 defines a pair of side flanges 58 projecting laterally outward beyond the opposing sides of the lower portion 54. The upper portion is wider than the space between the rail members 30 in the lateral direction so that the upper portion 48 of the camera mount is arranged to be engaged upon a top side the rail members when the lower portion is received downwardly in between the rail members.

The linkage 46 comprises two link members 60, each having an upper end 62 pivotally mounted about a respective horizontal pivot axis oriented perpendicularly to the rail members at a respective one of the two opposing ends of the camera mount 44 and a lower end 64 pivotally mounted about a horizontal axis orientated perpendicularly to the rail members at a selected location along the rail members.

The upper end of each link member 60 is secured for pivotal movement about a respective upper pivot shaft 66 which is fixed relative to the camera mount and is positioned to extend between the two depending flanges 56 forming the lower portion 54 of the camera mount at the respective one of the opposed ends of the camera mount.

Each lower end 64 is in turn supported for pivotal movement about a respective lower pivot shaft 68 extending between the two rail members 30. The lower pivot shafts are each supported between the two rail members by a pair of rail mounts 70 supported on the rail members 30 for sliding movement therealong respectively.

Each rail mount 70 comprises a body having a bore 72 extending therethrough through which the rail member is received. An expansion gap extends radially from each bore 72 to a bottom side of the body forming the rail mounts 70 respectively with a clamp mount 74 being provided to span across the gap for selectively tightening the bore about the rail member and clamping the rail mount to the rail member similar to the rail mount 34 of the base mount 32. When the clamp fasteners 74 are released the lower pivot shaft 68 is slidable along the rails while remaining in a horizontal orientation extending perpendicularly to the rails. The rotation and orientation of the pivot shaft 68 relative to the rail mounts 70 remains fixed. When the clamp fasteners 74 are tightened so that the rail mounts are clamped about the rail members respectively, the position of each lower pivot shaft 68 is fixed along the rails.

Each link member 60 is narrower in a lateral direction extending between the rails perpendicular to the longitudinal direction thereof than the space between the rail mounts 70 of the lower pivot shafts 68 that the link members are supported on. By providing link members which are narrower in the lateral direction than the length of the lower pivot shafts, the lateral positioning of each link member can be adjusted in the lateral direction between the rail members for in turn adjusting the lateral position of a camera supported on the camera mount relative to the rail members.

Each link member 60 comprises two side members 76 extending the full length between the upper and lower ends of the link member. The two side members are arranged for mounting alongside one another such that respective inner faces of the side members abut one another. At both ends of the side members the inner faces are provided with a recess arranged to receive a portion of the respective pivot shaft therein such that abutment of the inner faces of the two side members against one another serves to clamp opposing ends of the two side members about the upper and lower pivot shafts respectively.

A suitable pivot locking mechanism in the form of clamp fasteners 78 are provided which are connected between the two side members 76 of the link members so that tightening the clamp fasteners serves to clamp the two side members together and clamp the pivot shafts therebetween such that relative rotation between the link members and the pivot shafts is prevented in the clamped position. Releasing the clamp fasteners 78 in turn loosens the two side members of each link member about the respective pivot shafts to permit the link members to once again be pivoted about the respective pivot shafts to vary the angular inclination thereof relative to the rail members and the camera mount.

Each of the two side members 76 of each link member, and in turn the two link members 60 are all arranged to be reversible and interchangeable with one another to simplify the number of components to be manufactured. The clamp fasteners 78 may be any form of threaded screw including a suitable head which permits manual gripping for tightening or loosening the fasteners without tools being required, or optionally a suitable socket may also be provided for tighter securement with tools as may be desired.

In addition to the link members 60 shown in FIGS. 1 through 4, auxiliary link members 80 are also provided which are identical in configuration to the link members 60 so as to be formed of two side members 76 clamped about the pivot shafts using clamp fasteners 78. The auxiliary link members 80 are approximately twice as long in length as compared to the link members 60 so that the camera mount can be supported at a greater space above the rail members in the elevated position. This is particularly suited for use with an offset lens adapter 20 of the type shown in FIG. 5 to permit the camera to be offset above the lens supported on a suitable accessory mount 82 as described further below.

When providing a shorter length member 60 a single clamp fastener 78 is provided on each link member at a central location evenly spaced between the opposing ends of the link member, as shown in FIGS. 1 through 4. Alternatively when providing longer auxiliary link members 80, two clamp fasteners 78 are provided at spaced apart positions between the two opposed ends so that the clamp fasteners are located adjacent the pivot shafts at the opposed ends respectively as shown in FIGS. 5 through 7.

Figure 5:
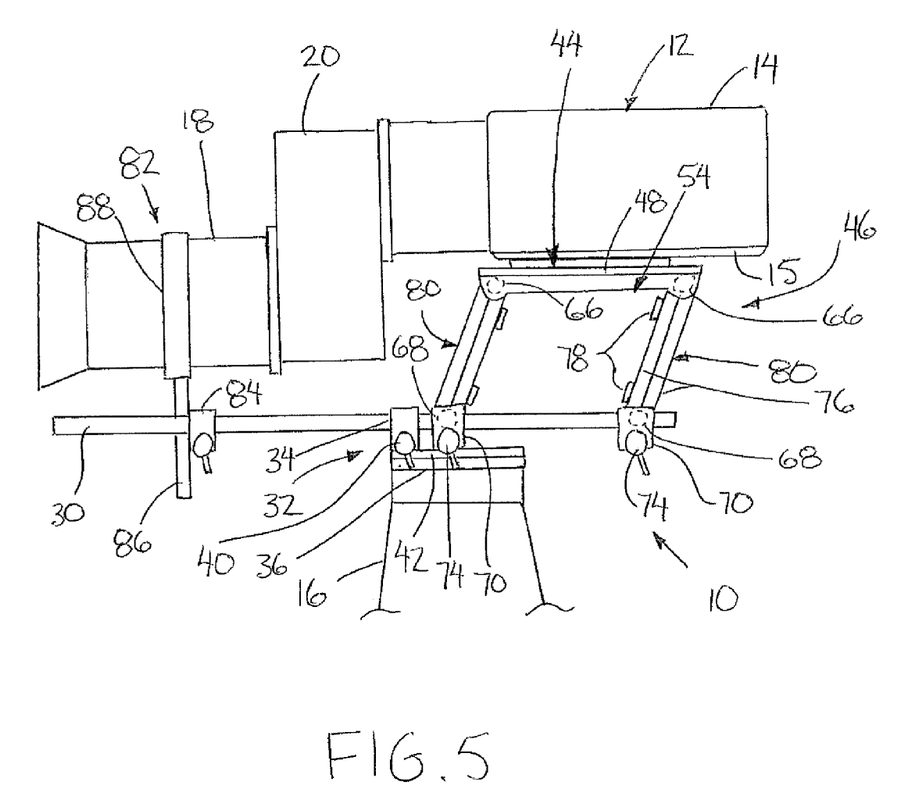
FIG. 5 is a side elevational view of a second mounting configuration of the camera mounting system.
Figure 6:
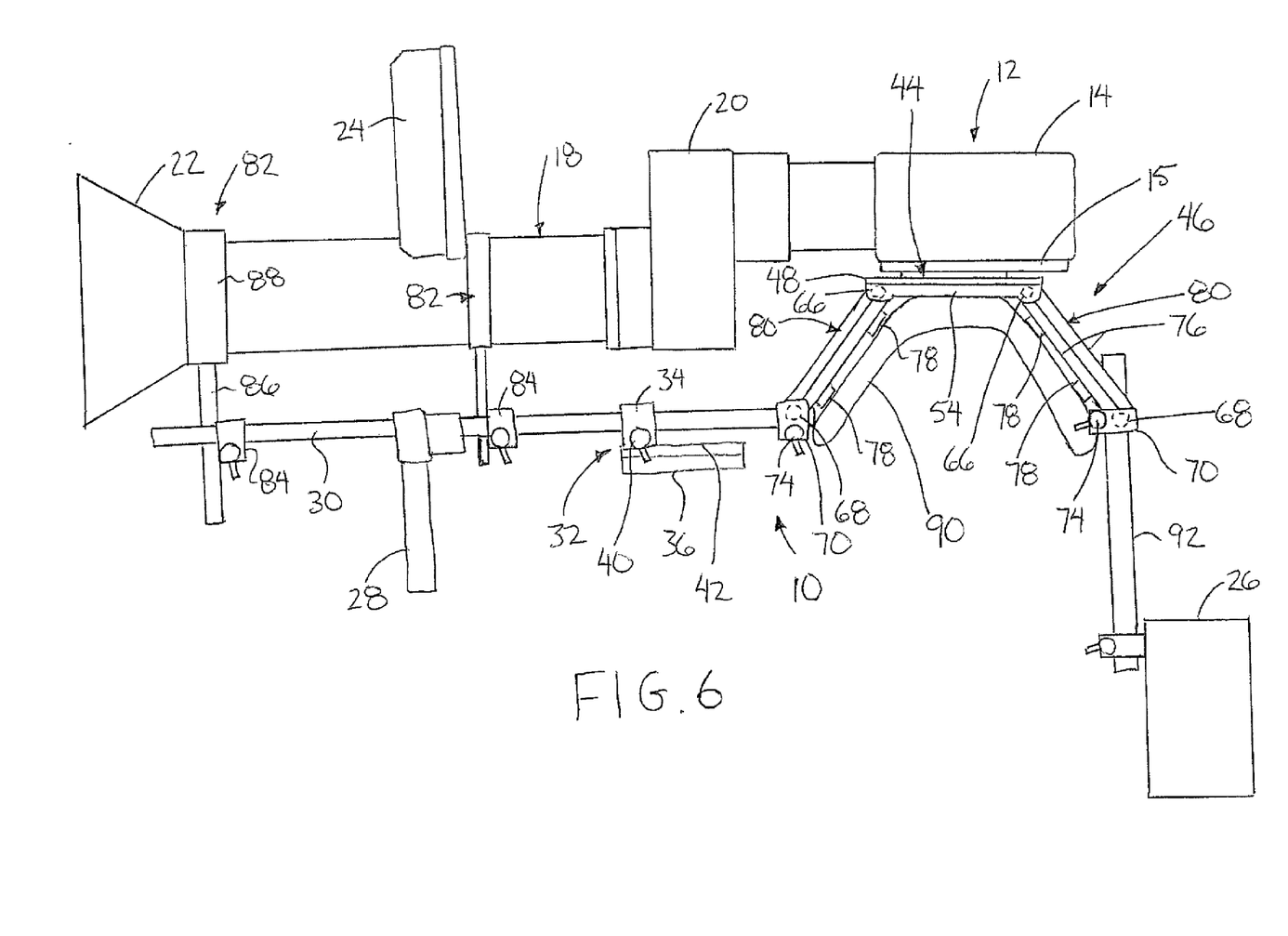
FIG. 6 is a side elevational view of a further mounting configuration of the camera mounting system in a shoulder mounting mode.

When using the camera mounting system 10 in a base mounting mode the link members can be positioned parallel to one another as shown in FIG. 5 by arranging the space between the lower pivot shafts 68 to be equal to the space between the upper pivot shafts of the camera mount. In this manner the upper surface of the camera mount remains horizontal and parallel to the rail members as the link members are pivoted relative to the rail members and height of the camera mount is varied relative to the rail members. Tightening the clamp fasteners 78 permits the link members of the linkage to be fixed at any one of an infinite number of positions.

The rail mount 34 of the base mount 32 being offset to one end of the base plate 36 permits the base plate to be slid beneath the linkage and the camera mount when the rail mount of the base mount is abutted against the rail mounts of the linkage as shown in FIG. 5. Throughout pivoting movement of the camera mount between elevated and lowered positions, the linkage always remains fully above the rail members so as not to project below the rail members and so as not to interfere with relative movement between the base mount and the rail members in either elevated or lowered positions of the camera mount. If desired, the rail mount 34 of the base mount 32 can also be readily be positioned between the rail mounts 70 of the two link members as shown in FIG. 1 to permit balancing of the camera assembly about the base structure upon when it is mounted.

Figure 1:
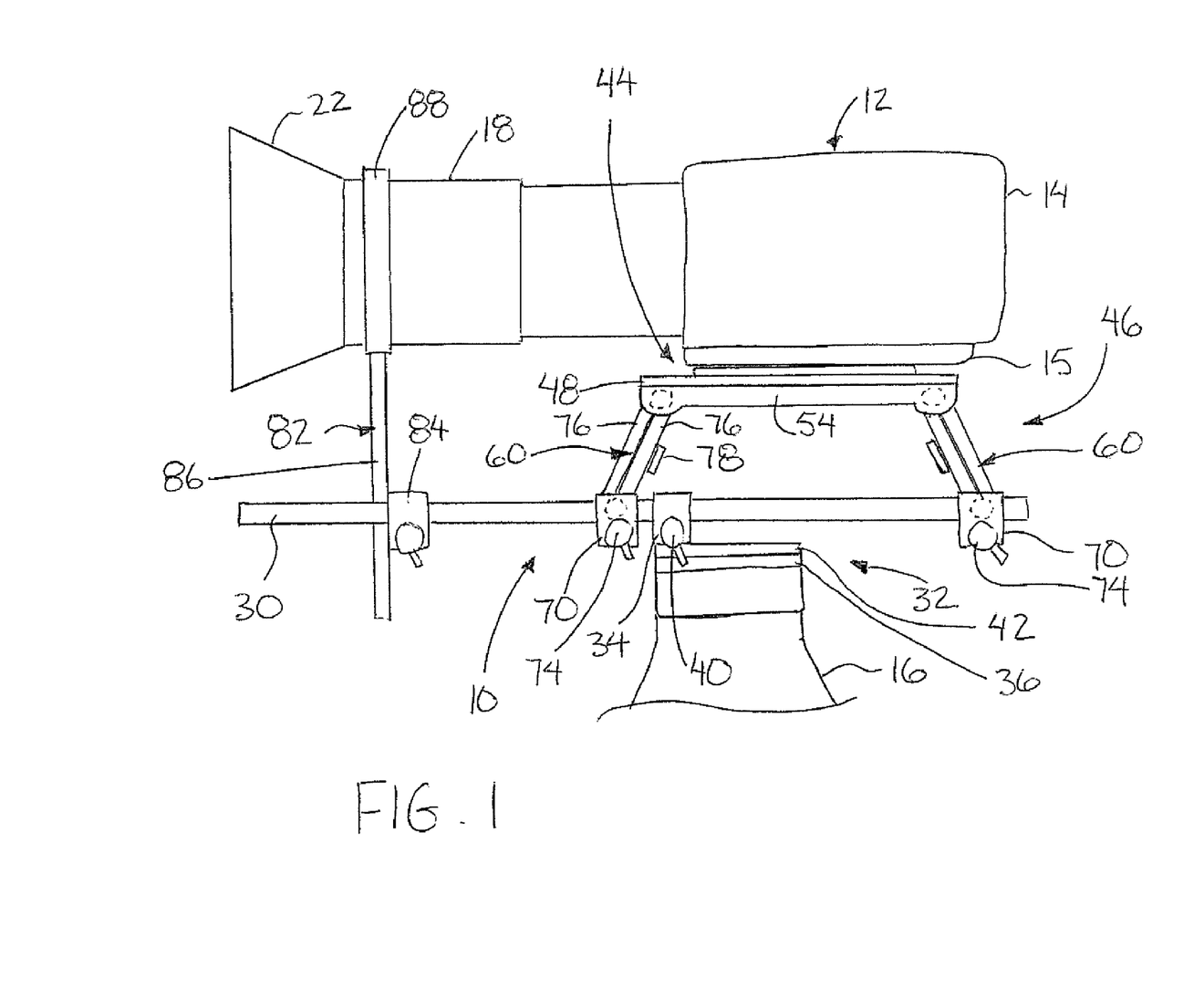
FIG. 1 is a side elevational view of the camera mounting system in a first configuration.
Figure 2:
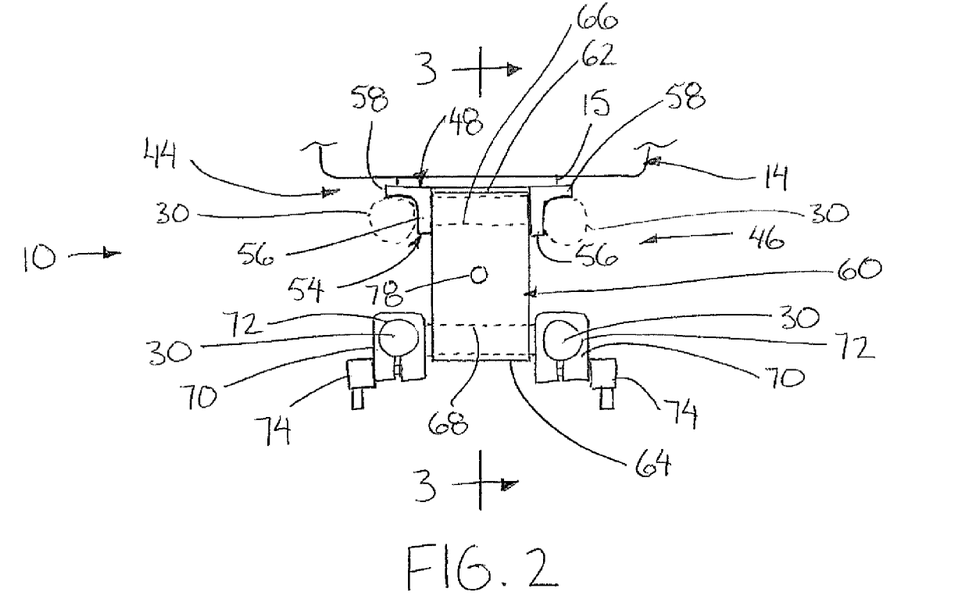
FIG. 2 is an end elevational view of the camera mount supported above the rail members by the linkage according to the configuration of FIG. 1.
Figure 3:
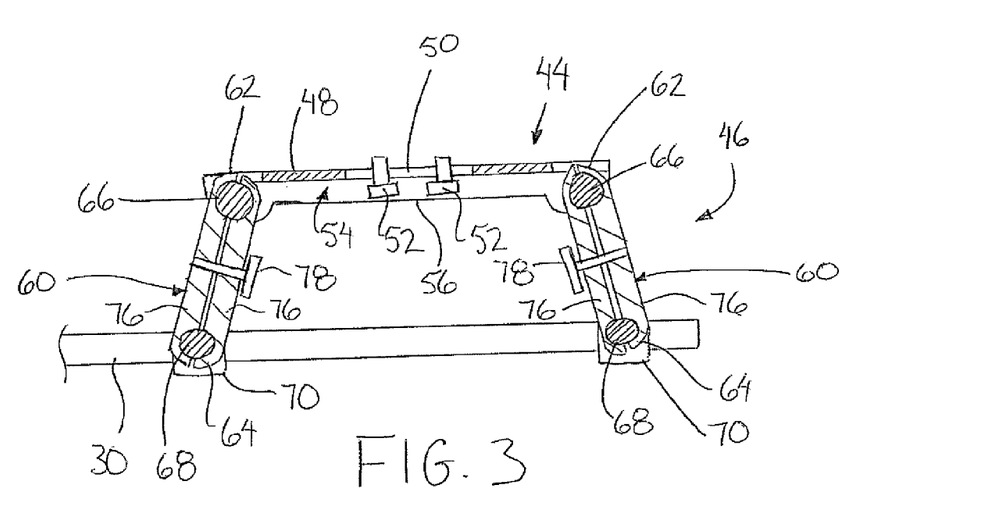
FIG. 3 is a sectional view along the line 3-3 of FIG. 2.
Figure 4:
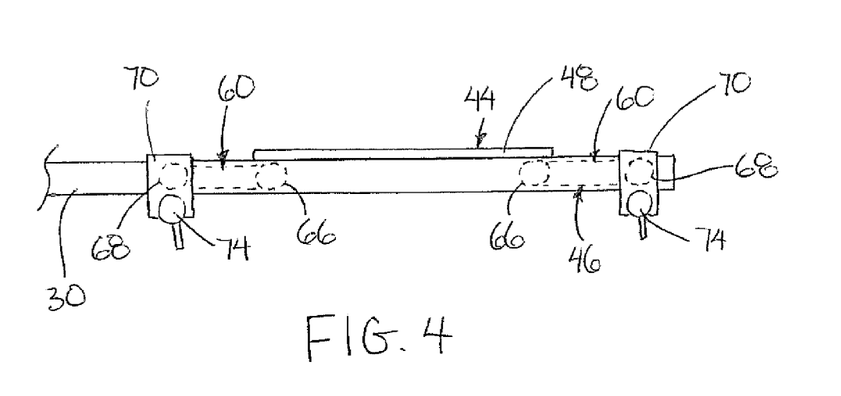
FIG. 4 is a side elevational view of the linkage in the lowered position of the camera mount relative to the rail members.

Alternatively in the base mounting mode, the link members can also be mounted in a non-parallel configuration as shown in FIG. 1 so that the rail mounts of the lower pivot shafts are spaced farther apart or closer together than the pivot shafts of the camera mount. By spreading the lower ends of the link members apart through sliding of the rail mounts 70 along the rail members, the camera mount can be lowered into the lowermost lowered position of FIG. 4 in which the lower portion of the camera mount is received between the rail members and the upper portion abuts the top side of the rail members. In this instance the two link members 60 extend outwardly from opposing ends of the camera mount to be similarly received between the two rail members so that both link members and the camera mount all lie parallel with the rail members. Even in the lowest position of FIG. 4, no portion of the linkage supporting the camera mount adjustably relative to the rail members protrudes below the rail members so that the linkage does not interfere with relative movement between the base mount and the camera mount on the rail members.

Figure 9:
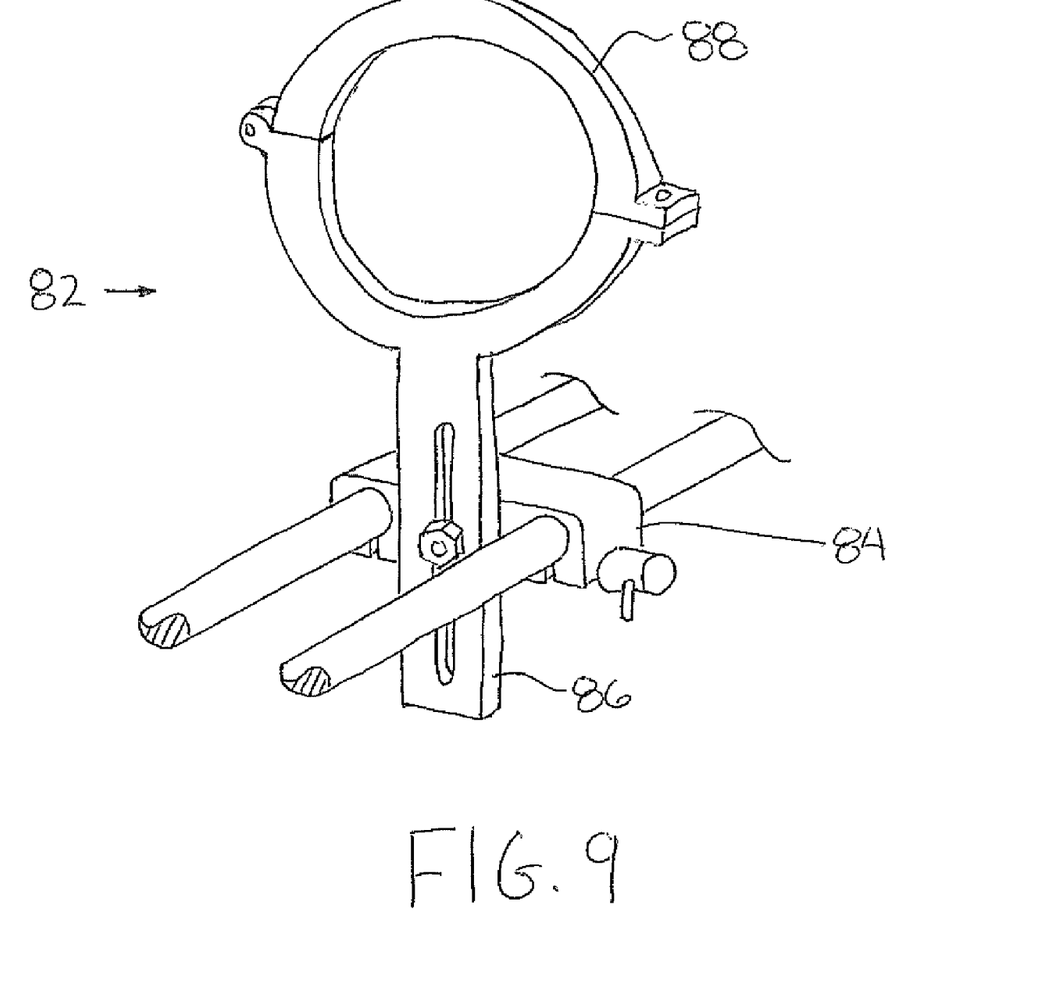
FIG. 9 is a perspective view of a camera lens accessory mount.

As noted above, the camera mounting system can be used with an accessory mount 82 shown in further detail in FIG. 9. The accessory mount similarly comprises a rail mount 84 comprising a body which is slidable along the rail members by providing parallel and spaced apart bores in the body which are provided with suitable clamp fasteners to clamp the rail mount at a selected position along the rail members. A vertically adjustable support 86 extends vertically upward from the rail mount and is connected to the rail mount by a clamp fastener extending through a vertical slot in the support 86 to permit mounting at any one of a plurality of vertical positions relative to the rail mount. The accessory mount 82 as shown includes a suitable clamp ring 88 arranged to receive a lens therethrough. In other embodiments the clamp ring 88 may be replaced with other mounting brackets suitable for supporting a matte box 22 or a lens adapter 20 as may be desired.

As shown in FIG. 6, the camera mounting system 10 can also be used in a shoulder mounting mode in which only one of the link members 80 remains coupled to the rail members at the rail mounts 70 of the lower pivot shaft 68 thereof while the rail mounts 70 of the other link member 80 are separated from the rail members. Furthermore in the shoulder mounting mode, the two link members and the camera mount spanning between the upper ends thereof are positioned in an inverted U-shaped configuration of suitable dimension for receiving a shoulder of a camera operator therein.

Together with a shoulder pad 90 inserted beneath the camera mount, the two link members 80 and the camera mount form a saddle which sits on the shoulder of the operator while the camera mount retains its function of mounting a camera thereon so that the camera is supported on the shoulder of the operator. The handles 28 and the monitor are mounted along the rail members at suitable locations for being comfortably operated by the camera operator. The grips 28 and the monitor 24 are mounted on the rail members forwardly of the camera.

The rail mounts 70 of the link member 80 which is separated from the rail members 30 can be instead coupled to a pair of auxiliary rails 92 received through the rail mounts 70 to be parallel and spaced apart from one another in a pivoted orientation relative to the link member to orient the auxiliary rail members 92 to extend generally downward from the lower end of the link member. The auxiliary rails are thus suited for extending downwardly along the back of a camera operator supporting the camera mount on their shoulder in the shoulder mounting mode. The battery pack 26 or other accessories can be provided with suitable rail mounts which in turn mount on the auxiliary rail members 92 for providing some counterbalancing to the monitor, and various lens accessories supported on the rail members forwardly of the camera.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A camera mounting system for supporting a camera body of a video camera on a base structure, the system comprising:
   a pair of rail members extending in a longitudinal direction;
   a base mount arranged to support the rail members parallel and spaced apart from one another on the base structure in a generally horizontal orientation;
   a camera mount arranged to support the camera body of the video camera thereon; and
   a linkage pivotally coupled between the camera mount and the rail members such that the camera mount is movable relative to the rail members between an elevated position in which the camera mount is supported spaced above the rail members and a lowered position in which the camera mount is supported closer to the rail members than the elevated position;
   the base mount and the camera mount being movable relative to one another in the longitudinal direction of the rail members.

2. The system according to claim 1 wherein the linkage is arranged to be positioned so as not to project substantially below the rail members in both the lowered position and the elevated position such that the linkage does not interfere with relative movement between the base mount and the camera mount in either one of the lowered position or the elevated position of the camera mount.

3. The system according to claim 1 wherein the base mount comprises a rail mount mounted on the rail members so as to be arranged for sliding movement along the rail members and a base plate arranged to be mounted onto the base structure, the rail mount being connected to the base plate such that the base plate is oriented substantially parallel to the rail members.

4. The system according to claim 3 wherein the rail mount is offset adjacent one end of the base plate such that the base plate is arranged to extend beneath the camera mount when the rail mount is located on the rail members adjacent the linkage.

5. The system according to claim 1 wherein the linkage comprises at least one link member which is pivotally mounted between the rail members at a lower end and pivotally mounted on the camera mount at an upper end.

6. The system according to claim 5 wherein said at least one link member is arranged to be received between the rail members parallel to the rail members in the lowered position of the camera mount.

7. The system according to claim 5 wherein said at least one link member comprises two link members pivotally coupled to opposing ends of the camera mount at the upper ends thereof.

8. The system according to claim 5 wherein said at least one link member is supported on the rail members by a pivot shaft extending perpendicular to the rail members between a pair of rail mounts which are mounted on the rail members respectively so as to be arranged for sliding movement along the rail members.

9. The system according to claim 8 wherein said at least one link member is arranged for sliding movement between the rail members along the pivot shaft.

10. The system according to claim 5 wherein the upper end of said at least one link member is pivotal about a pivot shaft arranged to be fixed to the camera mount and the lower end of said at least one link member is pivotal about a pivot shaft arranged to be fixed between the rail members and wherein both of the pivot shafts of said at least one link member are oriented generally horizontally and perpendicularly to the longitudinal direction of the rail members.

11. The system according to claim 10 wherein there is provided a pivot locking mechanism arranged to selectively prevent relative rotation of said at least one link member about the respective pivot shafts.

12. The system according to claim 5 wherein there is provided an auxiliary link associated with said at least one link member, the auxiliary link and the link member being different in length relative to one another and identical in configuration so as to be interchangeable with one another.

13. The system according to claim 1 wherein the camera mount has a lower portion which is coupled to the linkage and which is arranged to be received between the rail members in the lowered position and an upper portion projecting laterally outwardly beyond opposing sides of the lower portion so as to be arranged to be engaged upon the rail members in the lowered position.

14. The system according to claim 1 wherein the camera mount has a lower portion coupled to the linkage and an upper portion comprising a slot extending in the longitudinal direction of the rail members so as to be arranged to receive a camera mounting fastener at any one of a plurality of positions along the slot.

15. The system according to claim 1 wherein the linkage comprises two link members pivotally coupled to opposing ends of the camera mount at respective upper ends of the link members and being arranged to be pivotally coupled to the rail members at respective lower ends of the link members in a base structure mounting mode, wherein at least one of the link members is releasable from the rail members and wherein the link members together with the camera mount extending therebetween are arranged to form an inverted U-shaped configuration extending beyond an end of the rail members so as to be arranged to receive a shoulder of a camera operator therein in a shoulder mounting mode.

16. The system according to claim 15 wherein there is provided a pair of auxiliary rails arranged to be coupled to the lower end of the link member which is released from the rail members in the shoulder mounting mode and at least one camera accessory supported on the auxiliary rails.

17. The system according to claim 1 wherein each rail member comprises an elongate rod formed of carbon fibre.

18. The system according to claim 1 in combination with a video camera accessory wherein the linkage is arranged to support the camera mount on the rail members such that a camera supported on the camera mount is directed forwardly in the longitudinal direction of the rail members and the system further comprises an accessory mount arranged to support the video camera accessory on the rail members.

19. The system according to claim 18 wherein the accessory mount comprises a lens accessory arranged to be supported on the rail members forwardly of the camera mount.

20. The system according to claim 1 in combination with the base structure wherein the base structure comprises a tripod.

\* \* \* \* \*